(12) United States Patent
Li et al.

(10) Patent No.: US 10,178,069 B2
(45) Date of Patent: Jan. 8, 2019

(54) SYSTEMS AND METHODS FOR MANAGING TOP-LEVEL DOMAIN NAMES USING CONSORTIUM BLOCKCHAIN

(71) Applicant: PEKING UNIVERSITY SHENZHEN GRADUATE SCHOOL, Guangdong (CN)

(72) Inventors: Hui Li, Guangdong (CN); Xiangui Wang, Guangdong (CN); Zhili Lin, Guangdong (CN); Jiangxing Wu, Guangdong (CN); Xueming Si, Guangdong (CN); Kedan Li, Guangdong (CN); Xin Yang, Guangdong (CN); Han Wang, Guangdong (CN)

(73) Assignee: PEKING UNIVERSITY SHENZHEN GRADUATE SCHOOL (CN)

( * ) Notice: Subject to any disclaimer, the term of this patent is extended or adjusted under 35 U.S.C. 154(b) by 0 days.

(21) Appl. No.: 15/921,319

(22) Filed: Mar. 14, 2018

(65) Prior Publication Data
US 2018/0287997 A1    Oct. 4, 2018

Related U.S. Application Data

(63) Continuation of application No. PCT/CN2017/079098, filed on Mar. 31, 2017.

(51) Int. Cl.
*G06F 15/16* (2006.01)
*H04L 29/12* (2006.01)

(52) U.S. Cl.
CPC ........ *H04L 61/302* (2013.01); *H04L 61/3005* (2013.01)

(58) Field of Classification Search
CPC .......................... H04L 61/302; H04L 61/3005
(Continued)

(56) References Cited

U.S. PATENT DOCUMENTS

| 2004/0098485 A1* | 5/2004 | Larson | H04L 29/12066 709/227 |
| 2017/0236123 A1* | 8/2017 | Ali | G06Q 20/401 705/75 |

(Continued)

FOREIGN PATENT DOCUMENTS

| CN | 101335618 | 9/2010 |
| CN | 105978697 | 9/2016 |

(Continued)

*Primary Examiner* — Karen C Tang
(74) *Attorney, Agent, or Firm* — Zheng Liu; Weintraub Tobin

(57) ABSTRACT

The present disclosure relates generally to internet technology and more specifically to managing Top-level domain (TLD) name based on blockchain. An example method of managing Top-level domain name comprises the following steps: A. Using TLD nodes to form alliance network in the blockchain; B. Layering the system architecture in the alliance network to separate operations and data; and C. Reaching consensus among all nodes in the alliance network through consensus mechanism. A more effective and efficient consensus mechanism will increase the safety and reliability of the system and improve the efficiency of the system. Layering the system structure will ensure the efficiency and portability of the system.

6 Claims, 6 Drawing Sheets

(58) Field of Classification Search
USPC .......................................................... 709/245
See application file for complete search history.

(56) References Cited

U.S. PATENT DOCUMENTS

2018/0041345 A1* 2/2018 Maim ..................... G06F 21/51
2018/0075527 A1* 3/2018 Nagla ................ G06F 21/6218
2018/0122006 A1* 5/2018 Kraemer ................ G06Q 40/04
2018/0129956 A1* 5/2018 Saxena .................. G06N 5/048

FOREIGN PATENT DOCUMENTS

| CN | 103347087 | | 12/2016 | |
|----|-----------|---|---------|---|
| CN | 106209947 | | 12/2016 | |
| WO | WO 2016120826 | * | 8/2016 | ........... H06L 9/3263 |
| WO | WO2016177026 | | 11/2016 | |

* cited by examiner

US 10,178,069 B2

SYSTEMS AND METHODS FOR MANAGING TOP-LEVEL DOMAIN NAMES USING CONSORTIUM BLOCKCHAIN

CROSS REFERENCE TO RELATED APPLICATION

This application is a continuation of PCT patent application no. PCT/CN2017/079098, filed Mar. 31, 2017, entitled "Systems and Methods for Managing Top-level domain Names using Consortium Blockchain," which is hereby incorporated by reference in its entirety.

TECHNICAL FIELD

The present disclosure relates generally to communication network and more particularly to domain name management using consortium blockchain.

BACKGROUND

Names (sometimes also referred to as identifiers) play an important role in all computer systems. They are used to share resources, to uniquely identify entities, to point locations, and more. An important consequence of naming is that the name can be resolved as to the entity it points to. Thus, name resolution allows programming process or threads to access the named entity. To resolve names, a naming system is needed.

The difference between naming in a distributed system and naming in a non-distributed system lies in how the naming system is implemented. Many of today's applications, such as some file naming systems and the World Wide Web, are based on a distributed naming scheme. Either the current Internet or any new network in the future will need a structured naming scheme based on a distributed system to resolve the various entities involved in the network. Domain name system (DNS) is a naming system used by the Internet to convert human-friendly (e.g., human-readable) machine or domain names into IP addresses. The DNS uses a hierarchical tree structured naming schemes, where the second highest domain names (the domain names below the root domain name) are top-level domain.

SUMMARY

The present disclosure aims to provide a method of managing top-level domain name based on consortium blockchain, to solve the technical problems described in the present disclosure.

In some implementations, a method of managing Top-level domain name based on consortium blockchain comprises the following steps:

A. using TLD nodes to form an alliance network having a P2P architecture in the blockchain;
B. layering the system architecture in the alliance network to separate operations and data;
C. reaching consensus among all nodes in the alliance network through consensus mechanism.

In some implementations, authentication of new entering TLD nodes by TLD nodes in Step A comprises the following steps A1. the new entering TLD node may send a request for registering as an authenticated node to any node within the TLD network.
A2. the node that receives the request for registration will broadcast the authentication request to all the nodes;
A3. each node in the network can choose to accept or reject the request according to its own rules; and broadcasts its acceptance or rejection to all the other nodes;
A4. any node that is accepted by more than half of the nodes in the network will be treated as accepted by the network, and such acceptance will be recorded.

In some implementations, the consensus mechanism by the nodes in the alliance network in step C comprises the following steps:

C1. each TLD node will independently verify each domain name operation according to its own standard;
C2. within a pre-set time, a node within the network will be randomly selected as an accounting node;
C3. use the selected TLD node to package valid domain name operations within the pre-set time into blocks and broadcast to other TLD nodes and update the TLD database.

In some implementations: the system architecture is separated into a bottom layer and a top layer during Step A, wherein the bottom layer is a blockchain embedded with domain name operations, and the top layer is a data layer constituted by Top-level domain name related data.

In some implementations: in the data layer, the TLD nodes update the TLD database by processing a series of Top-level domain operations, and write all operations into the underlying blockchain at the same time. In some implementations, the pre-set time is five minutes.

Another objective of the present disclosure is to provide a system of managing Top-level domain name based on blockchain. An example system comprises:

a building module for building alliance network in a blockchain using TLD nodes;
a separation module, configured to layer the system architecture in the alliance network separates to separate operations and data; and
a node consensus module, configured to reach consensus amount all nodes in the alliance network through consensus mechanism.

In some implementations: authentication of new entering TLD node by the TLD node in the building module comprises:

a registration request sending unit, configured to enable the new entering TLD node to send request for registering as an authenticated node to any node in the network.
an authentication request broadcasting unit, configured to enable the node that receives the request for registration to broadcast the authentication request to all the nodes;
a network node feedback unit, configured to enable each node in the network to accept or reject the request according to its own rules, and broadcasts its acceptance or rejection to all the other nodes;
an acceptance approval recording unit, configured to approve and record any node that is accepted by more than half of the nodes in the network, as accepted by the network.

In some implementations: wherein the consensus mechanism by the nodes in the alliance network in the node consensus module comprises:

a determination unit, configured to enable each TLD node to verify each domain name operation according to its own standard;
an accounting node unit, configured to randomly select a node from the network, within the pre-set time, as an accounting node;

a data-packaging unit, configured to use the selected TLD node to package valid domain name operations within the pre-set time into blocks and broadcast to other TLD nodes and update the TLD database.

In some implementations: the separation module, the system is separated into a bottom layer and a top layer. The bottom layer is a blockchain embedded with domain name operations, and the top layer is a data layer constituted by Top-level domain name related data. In the data layer, the TLD nodes update the TLD database by processing a series of Top-level domain operations, and write all operations into the underlying blockchain at the same time; the pre-set time is five minutes.

DETAILED DESCRIPTION

Figure 1:
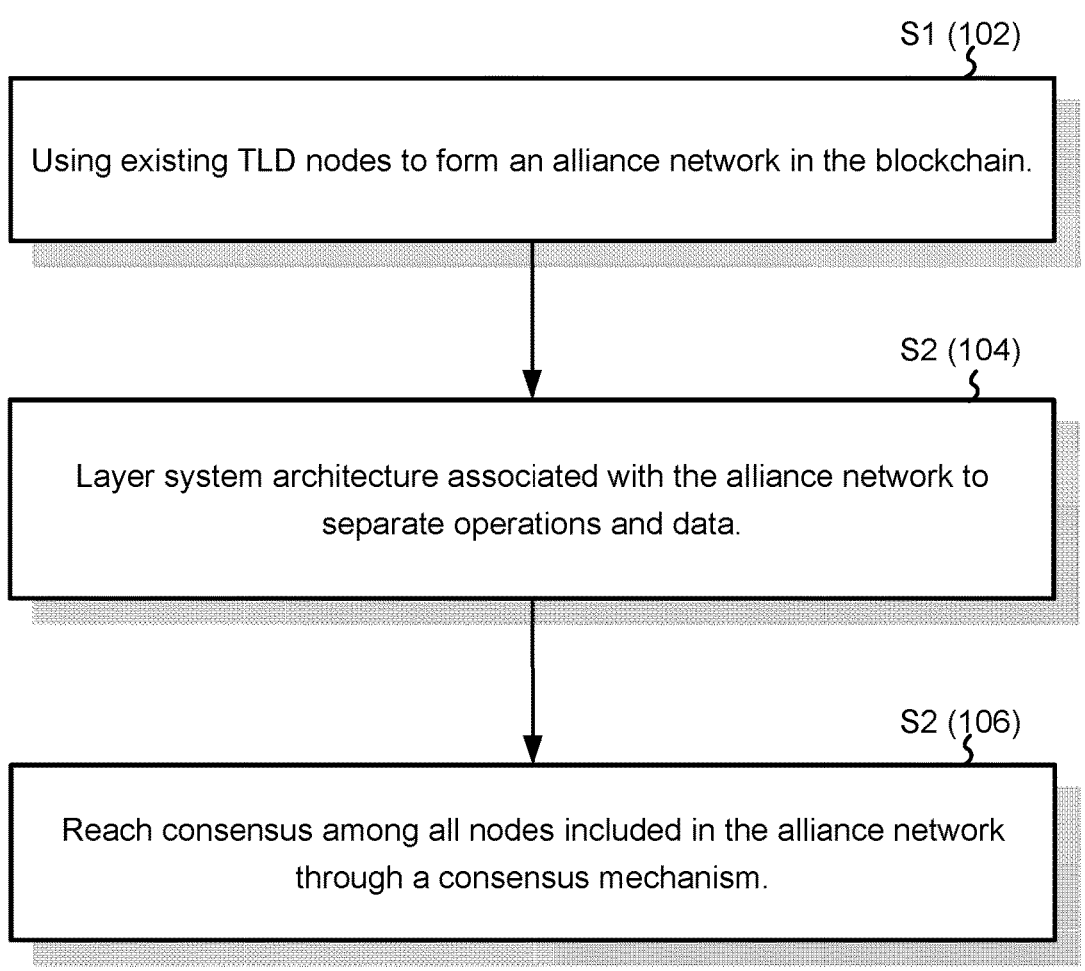
FIG. 1 is a flowchart illustrating an example method for managing top-level domain name using consortium blockchain, according to some implementations.

One of the largest distributed naming services used today is the internet domain name system (DNS), the standard for the DNS is RFC 1034,1035. The DNS namespace adopts a hierarchical tree structure naming scheme, and maps human-friendly names to IP addresses with a fixed length of 32-bit (128 bits in length for IPv6 addresses). On the Internet, every host or router has a unique hierarchical name, its domain name. Here "domain" is a manageable partition in the namespace, a domain can be divided into one or more sub-domains, and sub-domains can be further divided, forming a top-level domain, one or more second-level domains, one or more third-level domains, and so on. Domain names are separated by dots.

Internet domain name system is an online distributed database system, using client-server implementation. The DNS enables most names to be resolved locally, with only a small percentage of names resolved requiring communications with remote servers over the Internet. DNS system queries are therefore highly efficient, and a single computer node failure will not affect the normal operation of the entire DNS system. Domain name server programs running on a domain name server resolve domain name and IP address.

When a process needs to resolve a host name into an IP address, the process calls the resolver program and becomes a client of the DNS. The domain name to be resolved is placed in a DNS request message and sent as a UDP user datagram to a local name server. After searching for the domain name, the local domain name server identifies and returns the corresponding IP address in a reply data packet. The process becomes able to communicate with the host, after obtaining the IP address of the host. If the local domain name server cannot handle the DNS request, the domain name server will temporarily become another client in the DNS and makes a query request to other domain name servers.

The domain names at all levels are governed by authorities at a higher domain name level, and the Top-level domain name chain is governed by ICANN, which centralizes the management of DNS. Entities attempting to obtain a top-level domain name may apply with ICANN.

Internet domain name servers are hierarchically structured. Each domain name server system serves certain level of the domain name system. Domain name servers can be divided into four categories: root name server, top-level domain name server, authoritative domain name server, and local domain name server. When a local domain name server cannot resolve a domain name, it turns to the root name server. However, the current distribution of root name servers is unevenly around the world. For example, according to data from 2012, a root name server is shared by every 3.75 million internet users in North America. In Asia, in comparison, a root name server is shared by more than 20 million internet users. As a result, internet users in Asia enjoy a significantly slower domain name resolution speed than users in North America do, and when a root name server in Asia malfunctions, more than 20 million Internet users' requests for domain name resolution will be affected. It also results in a significantly lower reliability in Asian domain name resolution.

Blockstack is a decentralized DNS system, an open source system based on the Bitcoin blockchain. It combines DNS functionality with public key infrastructure, and is primarily used for new blockchain applications. Through separating the control layer from the data layer, Blockstack separates registration and the owner of the domain name from the name-related data. The control layer contains the blockchain layer and the virtual chain layer; while the data layer contains the routing layer and storage layer. Blockstack system architecture in fact consists of four layers. The blockchain occupies the bottom layer, stores a series of Blockstack operations, and provides the same order in writing for these operations. Blockstack currently uses the Bitcoin blockchain as the blockchain layer. The virtual link layer defines its own protocol above the blockchain layer, with transaction records that can only be detected by Blockstack system software. The routing layer maps the names defined in the control layer to the data storing files, avoiding the system from using any particular storage service from the start, and therefore allowing service from multiple storage providers. The top layer is the storage tier, which stores the actual "name-value" paired data, including large amounts of data. Blockstack employs a layered structure, to ensure that when one malfunctioning layers would not affect the normal operation of the other layers. It also reduces the amount of data transmitted by the control layer. Blockstack employs a global naming system based on name operation of Namecoin. Blockstack puts forward the concept of virtual chain to make the system more scalable and expansible. Blockstack also uses a simplified name authentication protocol based on consistent hashing to accelerate node validation and joining.

Blockstack is not easily compatible with the existing DNS systems. The internet DNS system uses a hierarchical tree domain name structure, and the domain name server levels are arranged in levels. Blockstack does not use a hierarchical tree domain name structure, there is no hierarchical relationship between domain names.

Blockstack completely decentralized design makes the system difficult to regulate and monitor. Although Blockstack allows users to freely apply for domain names without any agency restrictions and regulations, such a structure may generate many "zombie" domain names, and can, in extreme cases, be a hotbed of crimes because no one can be certain which user holds the private key corresponding to the domain name. Top-level domain names are considered real trademarks of network enterprises. They are an important part of strategic development of corporate brands. Blockstack would abandon the existing DNS concept. As a result, Top-level domain names may be introduced freely, and lose their special value.

The present disclosure has the following beneficial effects: the present disclosure is different from the DNS in that the internet DNS at all levels are centrally managed; the present disclosure is a Top-level domain name management scheme based on blockchain technology. The present disclosure decentralizes in selecting top-level domain managers (TLD nodes) and Top-level domain registrations—none of the TLD nodes in a consortium or a small group can control the entire management process. The present disclosure separates the domain name system into two layers, each corresponding to a sub-domain name system, and how the sub-domain name system is designed is determined by the holder of the Top-level domain name. Therefore, the sub-domain name system can be designed as either centralized system or decentralized system according to the institutions' wishes.

In addition, since the information on blockchain is public and immutable, trusted agencies and even individuals can access information on blockchain and build a corresponding seed file database to store the mapping relations between the top-level and sub-domain name system. This means that all regions can set up a corresponding number of domain name servers according to their actual need in order to ensure the speed of internet access without being limited by other institutions. The present disclosure also proposes a method of managing a Top-level domain name chain, and proposes a data structure consisting of block headers and domain name operations to ensure a clearer data flow in the management process.

Blockstack uses a completely decentralized design that makes domain name registration more difficult than managing domain name. This invention, however, uses a compromising two-layer structure to solve this problem. Top-level domain name chain is managed by all authorized members instead of a small group of members who monopolize the power. Authorized members maintain the proper operation of the domain name system by formulating corresponding rules, for example, by formulating a series of rules to standardize the application of Top-level domain names, and thereby avoiding meaningless top-level domain. The maintenance institutions corresponding to each Top-level domain can design different of management schemes for the sub-domain name system according to their own wishes, which means the sub-domain name system can be designed as subsystems with strict management system or subsystems that are completely decentralized such as Blockstack. Users can apply for the corresponding sub-domain name according to their own needs.

In addition, compared with Blockstack, the present disclosure is completely compatible with the existing Internet. For example, adding a "root" top-level domain name can directly incorporate the Internet DNS as a sub-domain name system corresponding to the Top-level domain name. Obviously, the corresponding seed files are interfaces to the domain name resolution under the existing DNS system. Through a more concise and efficient consensus mechanism, the safety and reliability of the system are ensured, and the efficiency of the system is improved; the layered system structure ensures the efficiency and portability of the system.

FIG. 1 is a flowchart illustrating an example method 100 for managing top-level domain name using consortium blockchain, according to some implementations.

Step S1 (102), using TLD node to form a network based on consortium blockchain; a consortium blockchain network formed by TLD nodes is a p2p network formed by a group of key TLD nodes. TLD nodes have two main functions: 1) the nodes within the network carry out the task of authenticating and certificating new nodes; 2) check and verify the domain name operation; extract data and write the date to the TLD database; at the same time, write authenticated operation to the blockchain that is stored at the bottom layer. Considering the efficiency and fault tolerance of the authentication, the authentication of the new entering TLD nodes in this method comprises the following four steps:

Step S11. the new entering TLD node may send a request for registering as an authenticated node to any node within the TLD network; Step S12. the node that receives the request for registration will broadcast the authentication request to all the nodes; Step S13. each node in the network can choose to accept or reject the request according to its own rules, and broadcasts its acceptance or rejection to all the other nodes; Step S14. any node that is accepted by more than half of the nodes in the network will be treated as accepted by the network, and such acceptance will be recorded.

Figure 3:
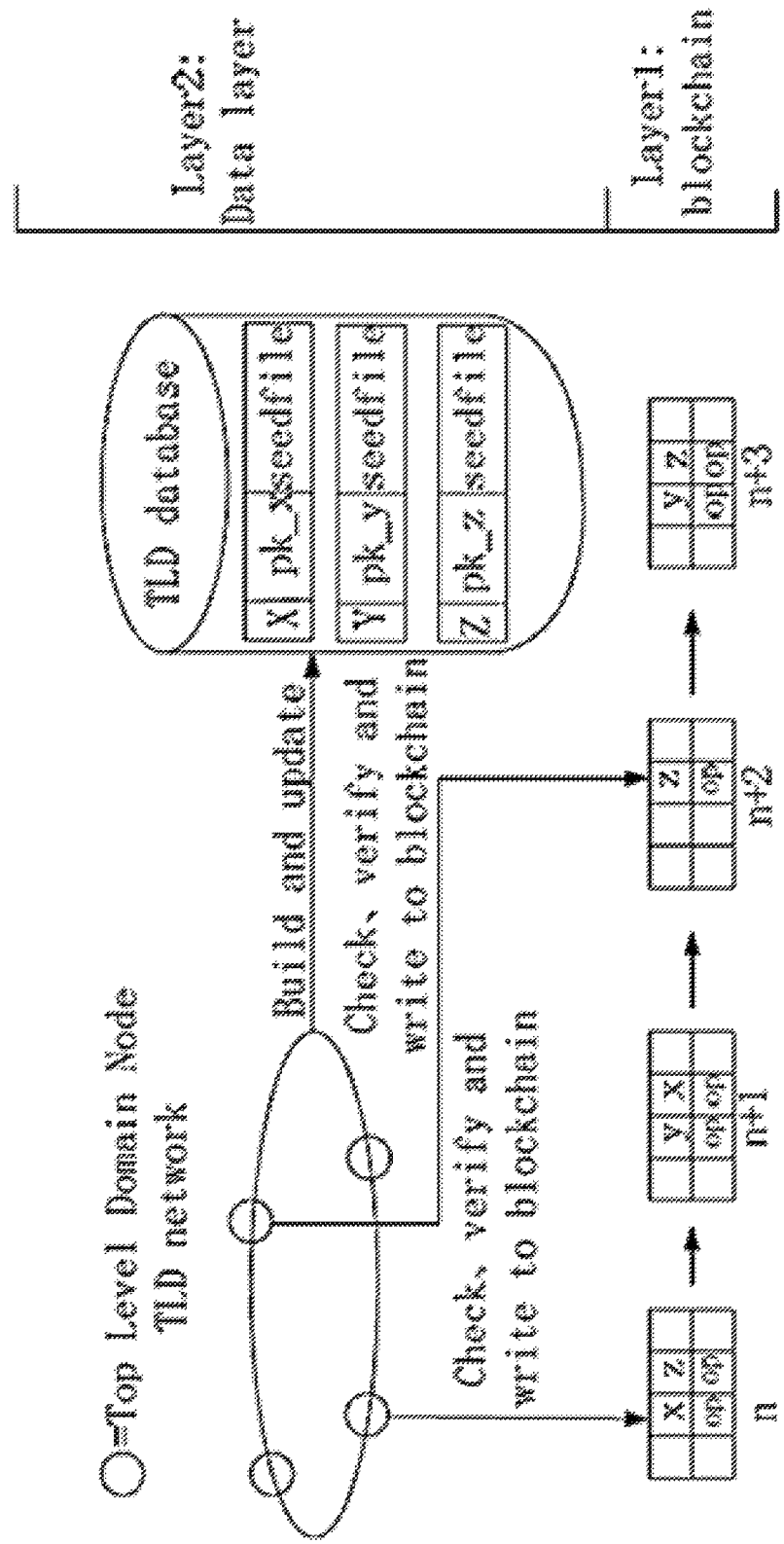
FIG. 3 is a block diagram illustrating an example method for managing top-level domain name using consortium blockchain, according to some implementations.

Step S2 (104), layering the system architecture in the alliance network, which has a Peer-to-Peer (P2P) architecture, to separate operations and data; the system architecture is separated into a bottom layer and a top layer. The top layer is a data layer constituted by Top-level domain name related data; in the data layer, the TLD nodes update the TLD database by processing a series of Top-level domain operations, and write all operations into the underlying blockchain at the same time; the pre-set time is five minutes. A series of Top-level domain nodes (TLDNs) construct a p2p network and jointly maintain Top-level domain names. Each node maintains a TLD, a public key for registering Top-level domain users, a TLD database for the sub-domain system seed file, signed by a private key. TLD nodes build and continuously update the databases by processing a series of Top-level domain name operations. These Top-level domain name operations mainly include registering Top-level domain names and updating seed files corresponding to the method 300, as illustrated in FIG. 3.

Figure 4:
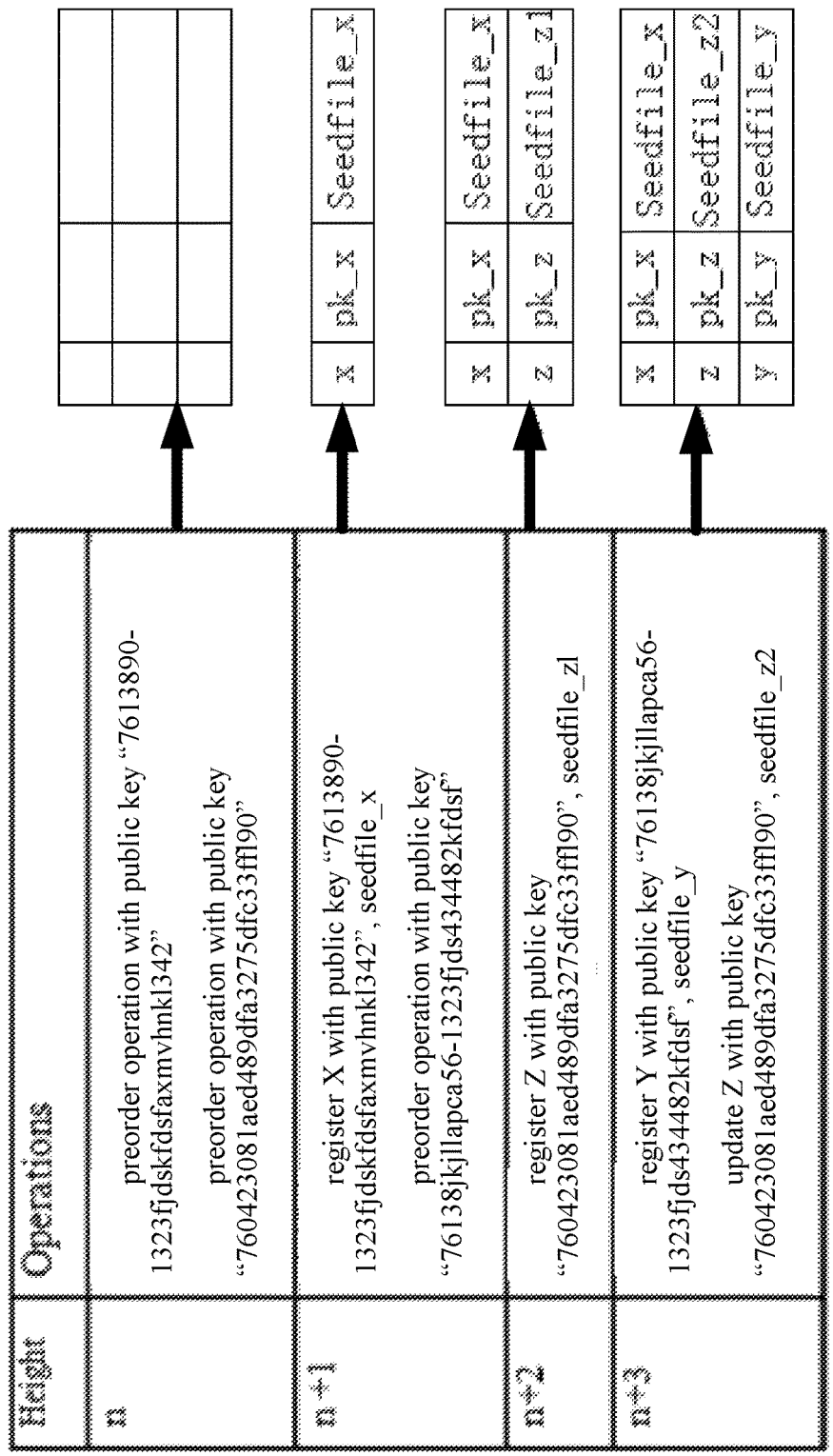
FIG. 4 is a block diagram illustrating an example top-level domain (TLD) database, according to some implementations.
Figure 5:
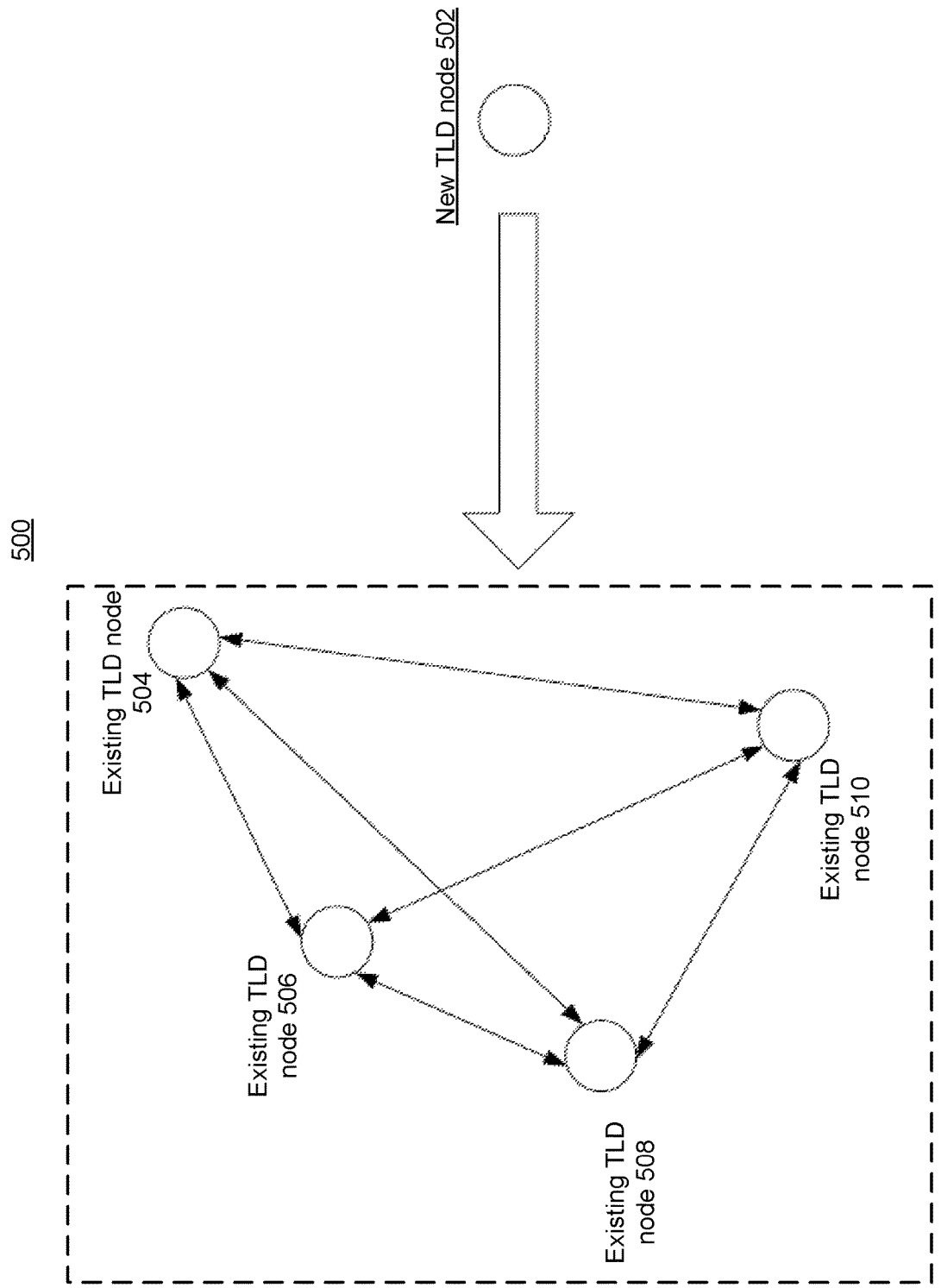
FIG. 5 is a block diagram illustrating an example method for adding a new TLD node, according to some implementations.

TLD nodes update the TLD database by processing a series of Top-level domain name operations, all of which are also written to the underlying blockchain. These Top-level domain name operations include registering Top-level domain names and deleting and updating seed files corresponding to the Top-level domain name. Similar to the Namecoin system, registration of Top-level domain names is divided into two stages: preorder and resister, which are also referred to as two-phase encryption commit protocols. The preorder operation declares registration of a Top-level domain name, but it neither exposes the name, nor changes the database. The preorder operation can prevent eavesdropping attackers from competing to become the sender of the operation and stealing the name. The delete operation deletes the relevant content from the TLD database. The update operation changes the seed file corresponding to the Top-level domain names. FIG. 4 is a block diagram illustrating an example top-level domain (TLD) database, according to some implementations. As shown in FIG. 4, some operations in the system are displayed, and to the right is the content stored in the TLD database.

At step S3 (106), reaching consensus among all nodes in the alliance network through consensus mechanism. The blockchain is often regarded as a book of recorded transactions. All nodes in the blockchain network are involved in the maintenance of the books. Compared with the POW consensus protocol in bitcoin networks, which are based on computing power, this method adopted a simpler consensus mechanism to make the nodes in the alliance network reach consensus.

This design is primarily due to two reasons: 1) because of the insufficient computing power in the participating consortium blockchain, POW is prone to 51% computing power attack; 2) on the other hand, each node in the consortium blockchain in this method is trusted, therefore, POW reward mechanism is not required. The consensus mechanism of consortium blockchain nodes in this method mainly goes through the following three steps: Step S31. Each TLD node performs independent verification for each domain name operation according to its own standard; Step S32. a node within the network will be randomly selected as the accounting node within a pre-set time; Step S33. use the selected TLD node to package valid domain name operations within the pre-set time into blocks and broadcast to other TLD nodes and update the TLD database.

Domain name operation, data structure and block structure in the blockchain are important for the whole system. The data structure and the mechanism should be designed based on the existing application of the blockchain. Based on the validity of the domain name operation, the TLD node packages valid domain name operations into a specific block header to generate the next block.

TABLE 1

Structure of Domain Name Operation

| Length | Field | Description |
| --- | --- | --- |
| 32 byte | Domain name operation hash | Ensure the correctness of the domain name operation |
| 128 bytes | Public key of the domain name operation initiator | Decrypt private key signature data, ensure security |
| 10 bytes | Specific domain name operation | Register/delete/update operation |
| 4 bytes | Timestamp | The time at which the domain name operation is validated |

TABLE 2

Structure of Block header

| Length | Field | Description |
| --- | --- | --- |
| 4 byte | Version | Version number, used to track software upgrades |
| 32 bytes | Hash of the previous block | Hash value of the previous blockchain |
| 32 bytes | Merkle root | The entire root of the merkle tree in the blockchain |
| 4 bytes | Timestamp | The time at which the domain name operation is verified |

Figure 2:
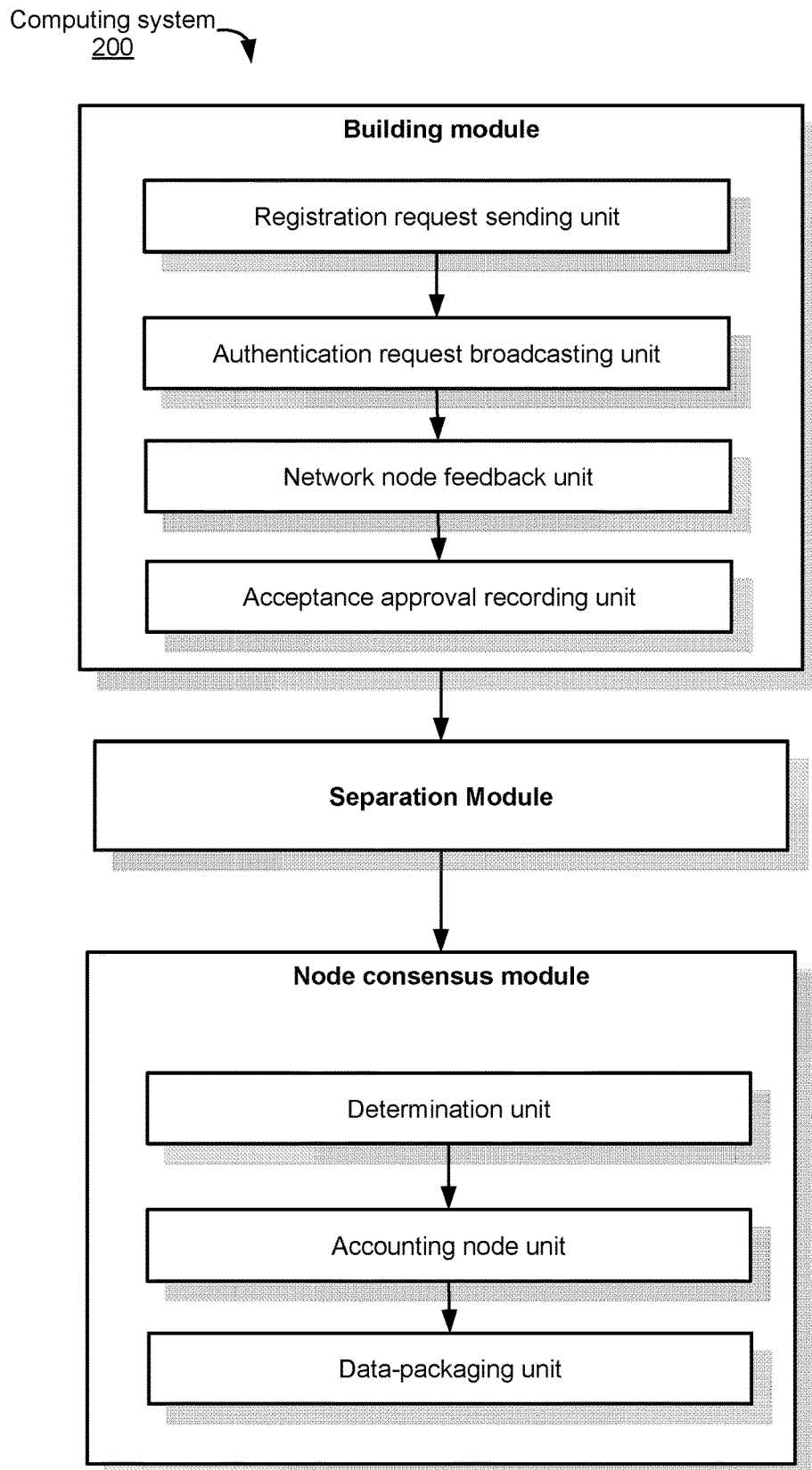
FIG. 2 is a block diagram illustrating an example system for managing top-level domain name using consortium blockchain, according to some implementations.
Figure 6:
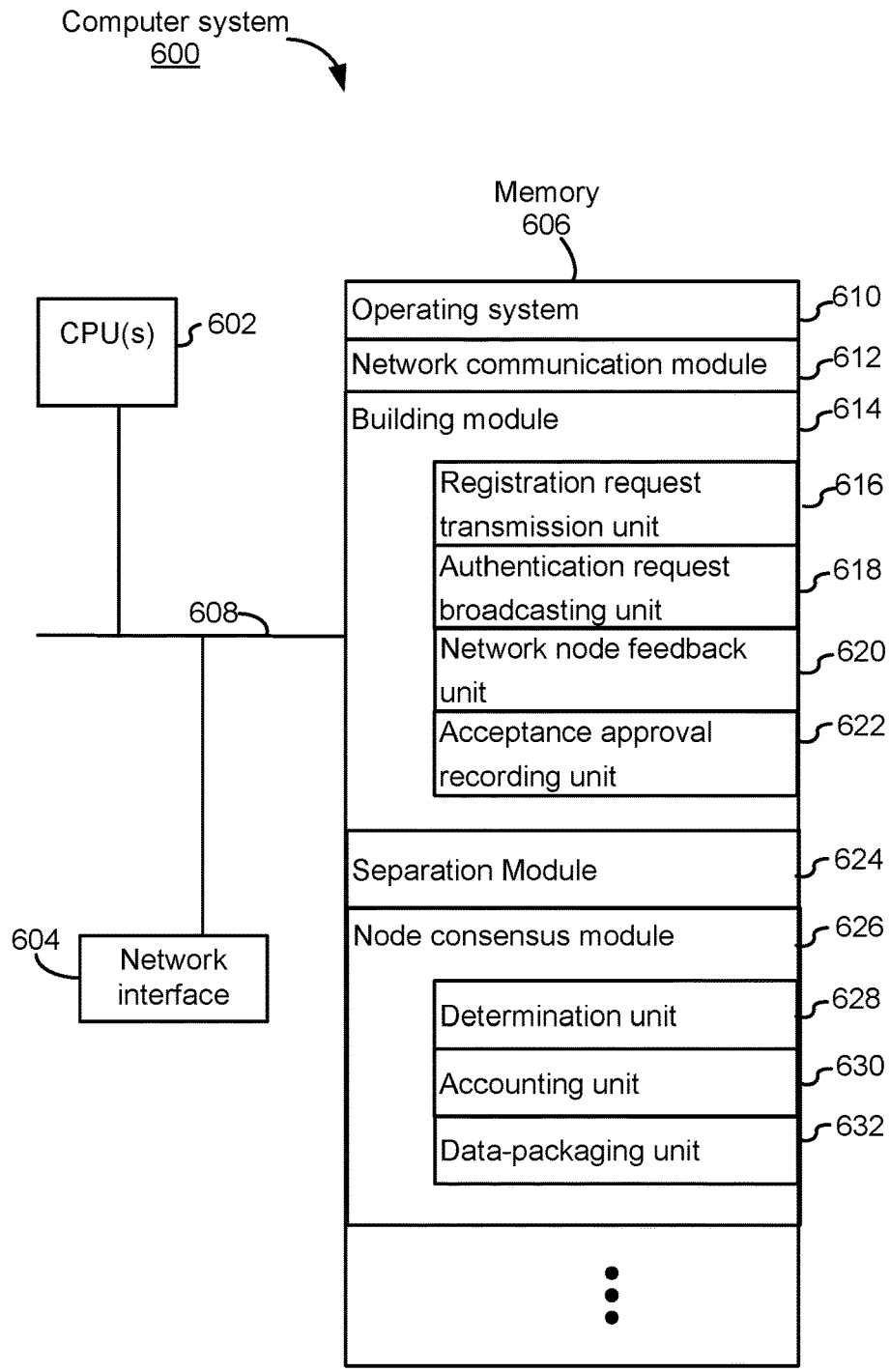
FIG. 6 is a block diagram illustrating an example computer system.

FIG. 2 is a block diagram illustrating an example system 200 for managing top-level domain name using consortium blockchain, according to some implementations. One example implementation of the system 200 is shown in FIG. 6 as the computer system 600.

As shown in FIG. 2, an example system comprises:
- a building module for building an alliance network in a blockchain using TLD nodes;
- a separation module, configured to layer the system architecture in the alliance network separates to separate operations and data; and
- a node consensus module, configured to reach consensus amount all nodes in the alliance network through consensus mechanism.

Authentication of new entering TLD node by TLD node in the building module comprises:
- a registration request sending unit, configured to enable the new entering TLD node to send request for registering as an authenticated node to any node in the network.
- an authentication request broadcasting unit, configured to enable the node that receives the request for registration to broadcast the authentication request to all the nodes;
- a network node feedback unit, configured to enable each node in the network to accept or reject the request according to its own rules, and broadcasts its acceptance or rejection to all the other nodes; and
- an acceptance approval recording unit, configured to approve and record any node that is accepted by more than half of the nodes in the network, as accepted by the network.

The consensus mechanism by the nodes in the alliance network in the node consensus module comprises:
- a determination unit, configured to enable each TLD node to verify each domain name operation according to its own standard;
- an accounting node unit, configured to randomly select a node from the network, within the pre-set time, as an accounting node; and
- a data-packaging unit, configured to use the selected TLD node to package valid domain name operations within the pre-set time into blocks and broadcast to other TLD nodes and update the TLD database.

The separation module separates the system architecture into a bottom layer and a top layer. The bottom layer is a blockchain embedded with domain name operations, and the top layer is a data layer constituted by Top-level domain name related data. In the data layer, the TLD nodes update the TLD database by processing a series of Top-level domain operations, and write all operations into the underlying blockchain at the same time; the pre-set time is five minutes.

The present disclosure is based on a two-layer structure design. The invention proposes a method of managing Top-level domain name based on blockchain. This management method makes the operation of the Top-level domain name system decentralized while properly managed. The Top-level domain name chain in the present disclosure adopts blockchain as a data structure to record transactions. The data structure, which involves proposed specific block header and domain name operations, better reflects decentralized features of this invention. In addition, the present disclosure introduces the concept of TLD nodes to enhance the management of Top-level domain name chains. The present disclosure also proposes the implementation of a TLD database that illustrates how to generate mapping from a blockchain to a seed files.

FIG. 6 is a block diagram illustrating an example computer system 600.

The computer system 600 typically includes one or more processing units CPU(s) 602 (also referred to as processors), one or more network interfaces 604, memory 606, and one or more communication buses 608 for interconnecting these components. The communication buses 608 optionally include circuitry (sometimes called a chipset) that interconnects and controls communications between system components. The memory 606 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 606 optionally includes one or more storage devices remotely located from CPU(s) 602. The memory 606, or alternatively the non-volatile memory device(s) within the memory 606, comprises a non-transitory computer readable storage medium. In some implementations, the memory 606 or alternatively the non-transitory computer readable storage medium stores the following programs, modules and data structures, or a subset thereof:

- an operating system 610, which includes procedures for handling various basic system services and for performing hardware dependent tasks;
- a network communication module (or instructions) 612 for connecting the collaboration system 106 with other devices (e.g., the user device 102) via the one or more network interfaces 604 (wired or wireless), or the communication network 104 (FIG. 1);
- a building module 614 for building alliance network, which include three functional units:
  - a registration request transmission unit 616;
  - an authentication request broadcasting unit 618;
  - a network node feedback unit 620; and
  - an acceptance approval recording unit 622;
- a separation module 624 for separating a system architecture in an alliance network into operations and data; and
- a node consensus module 626 for determining consensus of nodes in an alliance network, which include three functional units:
  - a determination unit 628 for determining whether a predefined condition has been met;
  - an accounting unit 630 for determining a total number of acceptances or rejections of adding a new node; and
  - a data-packaging unit 632.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 606 optionally stores a subset of the modules and data structures identified above. Furthermore, the memory 606 may store additional modules and data structures not described above.

Although FIGS. 2 and 6 show a "computing system 200" and a "computer system 600," respectively, FIGS. 2 and 6 are intended more as functional description of the various features which may be present in computer systems than as a structural schematic of the implementations described herein. In practice, and as recognized by those of ordinary skill in the art, items shown separately could be combined and some items could be separated.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, without changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The invention claimed is:

1. A method for managing exclusively Top-Level Domain (TLD) name based on a blockchain, comprising:
   A. using existing TLD nodes to form an affiance network in the blockchain;
   B. layering system architecture associated with the affiance network to separate operations and data;
   C. reaching consensus among all nodes included in the affiance network through a consensus mechanism; and
   D. using the existing TLD nodes to authenticate a new TLD node, which comprises:
      D1. Sending, a request for registration as an authenticated node received from the new TLD node, to any node in the existing TLD nodes included in the affiance network;
      D2. Receiving a request for registration at a first TLD node in the existing TLD nodes; and broadcasting, by the first TLD node, the request for authentication all other TLD nodes in the existing TLD nodes;
      D3. Receiving an acceptance or a rejection of the request for registration from each TLD node in the existing TLD nodes, the acceptance or the rejection being made based on each TLD node's own rules, and broadcasting the acceptance or the rejection from each TLD node to all other TLD nodes in the existing TLD nodes;
      D4. Determining a total number of acceptances received, authenticating the new node in accordance with a determination that the total number of acceptance is more than a half of a total number of nodes in the existing TLD nodes; and storing information associated with the new node after the new node is authenticated,
      wherein the consensus mechanism by the nodes in the affiance network in step C comprises:
   C1. each TLD node independently verifying each domain name operation according to its own standard;
   C2. within a pre-set time period, a node within the network randomly being selected as an accounting node; and
   C3. validating one or more domain name operations, including:
      determining (A) correctness of a domain name operation in the one or more domain name operations based on a hash function and generating a 32-byte data field to represent the determination (A);
      determining (B) data security of the domain name operation using a public key function and generating a 128-byte data field to represent the determination (B);
      determining (C) specific nature of the domain name operation using a name identifier assigned to the domain name and generating a 10-byte data field to represent the determination (C); and
      determining (D) validation time of the domain name operation using a timestamp assigned to the domain name and generating a 4-byte data field to represent the determination (D);
   C4. using the selected TLD node to package the one or more validated domain name operations within the pre-set time period into blocks and broadcast to other TLD nodes, and update a TLD database.

2. The method of claim 1, wherein the system architecture is separated into a bottom layer and a top layer during Step B, where the bottom layer is a blockchain embedded with domain name operations, and the top layer is a data layer storing data associated with top-level domain names; and further comprising:
   at the data layer, using the existing TLD nodes to update the TLD database by executing one or more top-level domain operations, and storing information identifying the one or more top-level domain operations into the blockchain at the bottom layer.

3. The method of claim 2, wherein the pre-set time period is five minutes.

4. A method for managing Top-Level Domain (TLD) name based on a blockchain, comprising:
   A. using existing TLD nodes to form an affiance network in the blockchain;
   B. layering system architecture associated with the affiance network to separate operations and data;
   C. reaching consensus among all nodes included in the affiance network through a consensus mechanism, the consensus mechanism by the nodes in the affiance network in step C comprises:
      C1. each TLD node will independently verify each domain name operation according to its own standard, wherein each domain name operation includes a public key;
      C2. within a pre-set time period, a node within the network will be randomly selected as an accounting node; and
      C3. validating one or more domain name operations, including:
         determining (A) correctness of a domain name operation in the one or more domain name operations based on a hash function and generating a 32-byte data field to represent the determination (A);
         determining (B) data security of the domain name operation using a public key function and generating a 128-byte data field to represent the determination (B);
         determining (C) specific nature of the domain name operation using a name identifier assigned to the domain name and generating a 10-byte data field to represent the determination (C); and
         determining (D) validation time of the domain name operation using a timestamp assigned to the domain name and generating a 4-byte data field to represent the determination (D);
      C4. using the selected TLD node to package the one or more validated domain name operations within the pre-set time period into blocks and broadcast to other TLD nodes, and update a TLD database;
   D. using the existing TLD nodes to authenticate a new TLD node, which comprises:
      D1. Sending, a request for registration as an authenticated node received from the new TLD node, to any node in the existing TLD nodes included in the affiance network;
      D2. Receiving a request for registration at a first TLD node in the existing TLD nodes; and broadcasting, by the first TLD node, the request for authentication all other TLD nodes in the existing TLD nodes;
      D3. Receiving an acceptance or a rejection of the request for registration from each TLD node in the existing TLD nodes, the acceptance or the rejection being made based on each TLD node's own rules, and broadcasting the acceptance or the rejection from each TLD node to all other TLD nodes in the existing TLD nodes; and D4. Determining a total number of acceptances received, authenticating the new node in accordance with a determination that the total number of acceptances is more than a half of a total number of nodes in the existing TLD nodes; and storing information associated with the new node after the new node is authenticated.

5. The method of claim 4, wherein the system architecture is separated into a bottom layer and a top layer during Step B, where the bottom layer is a blockchain embedded with domain name operations, and the top layer is a data layer storing data associated with top-level domain names; and further comprising:

at the data layer, using the existing TLD nodes to update the TLD database by executing one or more top-level domain operations, and storing information identifying the one or more top-level domain operations into the blockchain at the bottom layer.

6. The method of claim 5, wherein the pre-set time period is five minutes.

* * * * *